(12) United States Patent
Wimmer

(10) Patent No.: US 8,346,404 B2
(45) Date of Patent: Jan. 1, 2013

(54) DETERMINING A BUS BAR VOLTAGE

(75) Inventor: Wolfgang Wimmer, Rlethelm (CH)

(73) Assignee: ABB Technology AG, Zurich (CH)

( * ) Notice: Subject to any disclaimer, the term of this patent is extended or adjusted under 35 U.S.C. 154(b) by 156 days.

(21) Appl. No.: 12/849,355

(22) Filed: Aug. 3, 2010

(65) Prior Publication Data

US 2011/0029149 A1 Feb. 3, 2011

Related U.S. Application Data

(63) Continuation of application No. PCT/EP2009/051004, filed on Jan. 29, 2009.

(30) Foreign Application Priority Data

Feb. 4, 2008 (EP) .................... 08151039

(51) Int. Cl.
*G01R 19/00* (2006.01)
(52) U.S. Cl. .................... 700/298; 702/64
(58) Field of Classification Search .............. 700/297, 700/298; 702/64
See application file for complete search history.

(56) References Cited

U.S. PATENT DOCUMENTS

| | | | |
|---|---|---|---|
| 7,050,280 B2 * | 5/2006 | Di Maio et al. | 361/93.1 |
| 2002/0064010 A1 | 5/2002 | Nelson et al. | |
| 2006/0108871 A1 | 5/2006 | Wimmer | |
| 2009/0005915 A1 | 1/2009 | Wimmer | |
| 2009/0076762 A1 | 3/2009 | Vetter et al. | |
| 2009/0187284 A1 * | 7/2009 | Kreiss et al. | 700/291 |

FOREIGN PATENT DOCUMENTS

| | | |
|---|---|---|
| EP | 1655669 A1 | 5/2006 |
| EP | 1819022 A1 | 8/2007 |
| EP | 1850447 A1 | 10/2007 |

OTHER PUBLICATIONS

International Standard IEC 61850-8-1, First edition May 2004, Communication networks and systems in substations—Part 8-1: Specific Communication Service Mapping (SCSM)—Mappings to MMS (ISO 9506-1 and ISO 9506-2) and to ISO/IEC 8802-3.
International Standard IEC 61850-9-2, First edition Apr. 2004, Communication networks and systems in substations—Part 9-2: Specific Communication Service Mapping (SCSM)—Sampled values over ISO/IEC 8802-3.

(Continued)

*Primary Examiner* — Ryan Jarrett
(74) *Attorney, Agent, or Firm* — Buchanan Ingersoll & Rooney PC

(57) ABSTRACT

A Substation Automation (SA) system in high or medium voltage power networks is provided for determining a bus bar voltage at a first node. The disclosure replaces a 'real' voltage transformer with an intelligent electronic device (IED) and/or a 'virtual' voltage transformer (VT), which determines the bus bar voltage at the first node from a first bay connected to the first node. The IED receives network message from a second IED of the SA system, indicating the bay voltage of the first bay connected to the first node. The IED also receives switch status of the switching device arranged between the first bay and the first node, from a third IED. Depending upon the switch status, the IED establishes the bay voltage as the bus bar voltage at the first node.

11 Claims, 2 Drawing Sheets

OTHER PUBLICATIONS

International Search Report (PCT/ISA/210) issued on Jul. 7, 2009, by European Patent Office as the International Searching Authority for International Application No. PCT/EP2009/051004.
Written Opinion (PCT/ISA/237) issued on Jul. 7, 2009, by European Patent Office as the International Searching Authority for International Application No. PCT/EP2009/051004.
European Search Report issued on Sep. 1, 2008 by the European Patent Office for European Application No. 08151039.8.
Mike Foley, Object-Oriented On-Line Network Analysis, IEEE Transactions on Power Systems, Feb. 1995, No. 1, New York, USA pp. 125-132.

* cited by examiner

DETERMINING A BUS BAR VOLTAGE

RELATED APPLICATIONS

This application claims priority as a continuation application under 35 U.S.C. §120 to PCT/EP2009/051004, which was filed as an International Application on Jan. 29, 2009 designating the U.S., and which claims priority to European Application 081561039.8 filed in Europe on Feb. 4, 2008. The entire contents of these applications are hereby incorporated by reference in their entireties.

FIELD

The present disclosure relates to Substation Automation (SA) systems for substations in high and medium voltage power networks.

BACKGROUND INFORMATION

Substations in high and medium-voltage power networks include primary devices such as electrical cables, lines, bus bars, switches, power transformers and instrument transformers, which are generally arranged in switch yards and/or bays. These primary devices are operated in an automated way via a Substation Automation (SA) system. The SA system includes microprocessor based, programmable secondary devices, so-called Intelligent Electronic Devices (IEDs), which are responsible for protection, control and monitoring of the primary devices. The IEDs are generally assigned to one of three hierarchical levels, i.e. the station level, the bay or application level, and the process level, which is separated from the bay level by a process interface. The station level of the SA system includes an Operator Work Station (OWS) with a Human-Machine Interface (HMI) and a gateway to a Network Control Centre (NCC). IEDs on the bay level, also termed bay units, in turn are connected to each other and to the IEDs on the station level via an optical inter-bay or station bus.

IEDs on the process-level include, for example, sensors for voltage, current and gas density measurements, contact probes for sensing switch and transformer tap changer positions, or intelligent actuators for controlling a switchgear like circuit breakers or disconnectors. Breaker-IEDs, if shielded against electromagnetic disturbances, may even be directly integrated into the switchgear or respective intelligent primary equipment. Such process-level IEDs are connected to the bay units via a process bus, such as an optical bus, which can be considered as the process interface replacing the hardwired process-interface that conventionally connects the switchyard to the bay level equipment.

A communication standard for communication between the secondary devices of a substation has been introduced by the International Electrotechnical Committee (IEC) as part of the standard IEC 61850 entitled "Communication Networks and Systems in Substations". For non-time critical messages, the communication between the IEDs is handled via a Manufacturing Message Specification (MMS) application level protocol and a reduced Open Systems Interconnection (OSI) protocol stack with the Transmission Control Protocol (TCP) and Internet Protocol (IP) in the transport and network layer, respectively, and Ethernet and/or RS-232C as physical media. On the other hand, time critical messages, which are referred to as Generic Object Oriented Substation Events (GOOSE, part IEC 61850-8-1 of the standard), build directly on the Ethernet link layer of the communication stack. Very time-critical signals at the process level, such as trip commands and measured analog voltages or currents, use a simplified variant of GOOSE known as Sampled Values (SV, part IEC 61850-9-2 of the standard) that also builds directly on the Ethernet link layer.

A Voltage Transformer (VT) can be connected to a bus bar of a substation and provide instantaneous values of the bus bar voltage, which are then distributed to all the bays connected to the bus bar. However, VTs are costly, and if they have to be maintained or replaced, the concerned part of the switch yard can be put out of operation for a long time. In addition, a VT used for a synchrocheck function at a bus bar represents a single point of failure, because a bay can cannot be connected to the bus bar if this bus VT fails.

To avoid making a bus bar VT a single point of failure, a bay VT of a bay currently connected to the bus bar is selected and switched to a dedicated cable or voltage bus of an SA system. The central cable then distributes this bay voltage as the bus bar voltage to all the bays needing it. Such SA systems use a relay or wiring logic to determine which bay VT is connected to the bus bar. However, this solution of bus bar voltage determination can result in electrical problems as well as other complications, if the logic does not work correctly or there are time delays. For example, if two VTs are accidentally connected to the central cable at the same time, it would destroy them both, causing possible danger to human beings near them. Also, in this case, the common relay or wiring logic becomes the single point of failure.

The advent of digital controllers rectified the issues associated with the accuracy of the logic and enhanced its reliability by expressing the selection logic as Boolean formulas calculated in the controllers. However, all the VTs have to be switched with some relay contacts to the bus bar related cable. Therefore, the danger of connecting them erroneously still persists, especially if the de-centrally implemented selection logic is too simple. A solution to this problem is centrally implemented selection logic on a controller IED, which assures that only one VT is switched to the voltage bus cable. However, like the VT and the relay logic, the centrally implemented selection logic also becomes a single point of failure. In addition, these solutions also need a dedicated cable for the voltage running through all the bays, and A/D (analog-to-digital) converters at all the bays needing the bus bar voltage.

SUMMARY

An exemplary embodiment provides a method of determining a bus bar voltage at a first node of a bus bar of a substation controlled by a Substation Automation (SA) system. The exemplary method includes receiving, by a first Intelligent Electronic Device (IED) of the SA system, network messages, from a second IED of the SA system, that are indicative of a bay voltage of a first bay connectable to the first node. The exemplary method also includes receiving, by the first IED of the SA system, network messages, from a third IED of the SA system, that are indicative of a switch status of a switching device arranged between the first bay and the first node. In addition, the exemplary method includes establishing, by the first IED of the SA system, the bay voltage as the bus bar voltage at the first node, based on the switch status indicated in the network messages received from the third IED of the SA system.

An exemplary embodiment provides an Intelligent Electronic Device (IED) connectable to a Substation Automation (SA) communication network and assignable to a first node of a bus bar of a substation controlled by the SA system. The exemplary IED includes a reception unit configured to receive network messages, from a second IED of the SA system, that are indicative of a bay voltage of a first bay connectable to the first node, and to receive network messages, from a third IED of the SA system, that are indicative of a switch status of a switching device arranged between the first bay and the first node. The exemplary IED also includes a control unit configured to establish, depending on the switch status indicated in the messages received from the third IED, the bay voltage as the bus bar voltage at the first node.

An exemplary embodiment provides a Substation Automation (SA) system including an IED configured to determine a bus bar voltage at a first node of a bus bar of a substation controlled by the SA system. The IED of the SA includes a reception unit configured to receive network messages, from a second IED of the SA system, that are indicative of a bay voltage of a first bay connectable to the first node, and to receive network messages, from a third IED of the SA system, that are indicative of a switch status of a switching device arranged between the first bay and the first node. In addition, the IED of the SA includes a control unit configured to establish, depending on the switch status indicated in the messages received from the third IED, the bay voltage as the bus bar voltage at the first node.

BRIEF DESCRIPTION OF THE DRAWINGS

Additional refinements, advantages and features of the present disclosure are described in more detail below with reference to exemplary embodiments illustrated in the drawings, in which.

The reference symbols used in the drawings, and their meanings, are listed in summary form in the list of reference symbols. In principle, identical parts are provided with the same reference symbols in the figures.

DETAILED DESCRIPTION

Figure 1:
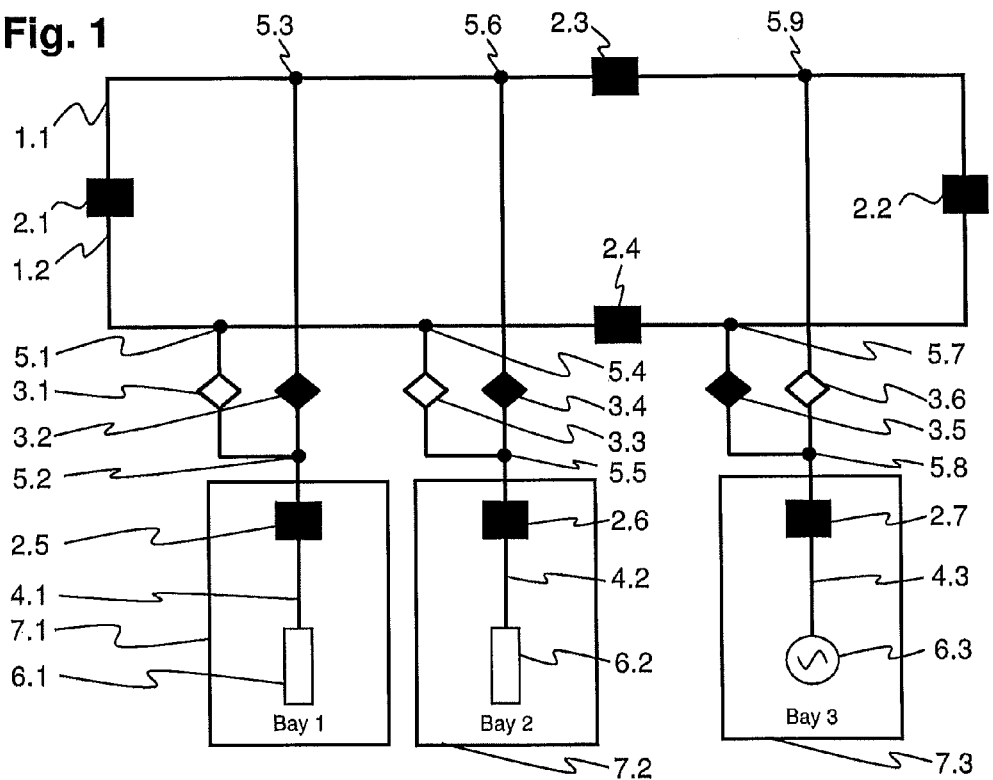
FIG. 1 shows a single-line electrical power distribution diagram of an exemplary switchyard with a double bus bar topology.

Exemplary embodiments of the present disclosure provide a serial process bus with sampled values, as introduced by IEC61850. In accordance with exemplary embodiments of the present disclosure, the voltage samples are distributed via the serial bus. As a result, no voltage transformer (VT) outputs have to be physically switched onto a dedicated cable or voltage bus. The IEDs of the bays connected to the serial bus then use some logic to select the needed voltage sample from the stream of samples on the serial bus. However, the architecture for this solution can be complex, because similar logic has to be placed in each receiving IED, with relatively complex logic in case of complex switch yard configuration, for example, with several bus bars and bus bar segments or bypass bus bars. Also, the high amount of samples on the serial bus may result in high load on the bus. This restricts the size of the bus bar because in the worst case all the samples have to be distributed to all the bays connected to the bus bar.

Accordingly, exemplary embodiments improve the reliability of a bus bar node voltage determination in an electrical power substation.

According to an exemplary embodiment, a high or medium voltage substation is controlled by a Substation Automation (SA) system including a number of Intelligent Electronic Devices (IEDs) connected to a communication network or serial process bus. The substation has a first node or segment of a bus bar, to which, via a first switching device, a first bay may be connected. In order to determine a bus bar voltage at the first node, a first IED is provided as a virtual voltage transformer, in place of a real, conventional or non-conventional voltage transformer, i.e. in place of a dedicated primary device connected to the first node. The first IED receives and reads network messages transmitted over the communication network, where such messages are indicative of a bay voltage of the first bay, as well as indicative of a switch status of the switching device connecting the first bay to the first node. If the switch status indicates that the first bay is actually connected to the first node, the bay voltage of the first bay is established or defined as the bus bar voltage of the first node. According to an exemplary embodiment, this node voltage can then be distributed or broadcasted, via further network messages.

According to an exemplary embodiment, the first IED is given a standardized description of a static substation topology representative of at least a first part of the substation including the first node and neighboring or adjacent sections, such as the first bay. The description may be provided to the first IED as part of an engineering process of the IEDs, and in terms of the substation communication standard IEC 61850, can be a Substation Configuration Description (SCD) file, for example. Accordingly, the relevant network messages that are intercepted by the first IED are Generic Object Oriented Substation Events (GOOSE) for the switch status and Sampled Values (SV) for the bay voltage. A comparison or evaluation of the static substation topology and the switch status indication allows identification of the first bay as actually being connected to the first node.

In case the switch status indicates that the first bay is not connected to the first node or sends no valid voltage samples, the first IED, according to an exemplary embodiment of the present disclosure, sequentially takes into consideration a second or further bay connectable to the first node, and any bus bar section neighboring the first bus bar node. This process terminates as soon as a valid voltage can be unambiguously identified as originating from a voltage transformer monitoring a part of the substation, i.e. the second or further bay or the neighboring bus bar section, which is actually connected, via closed switching devices, to the first node. The sequential nature of this procedure eliminates the single point of failure that is constituted by a dedicated real voltage transformer permanently connected to the first node.

An IED transmitting the network message indicative of the voltage may be assigned to a real voltage transformer, or may itself be a virtual voltage transformer. According to an exemplary embodiment, as neighboring bus bar node connections are checked last, 'real' voltages may be given preference over 'virtual' voltages from other virtual voltage transformers. According to another exemplary embodiment, if more than two connected neighboring bus bar nodes are found, the higher voltage can be preferred, and if no connected bay or bus bar node is found, a 'preconfigured' zero voltage message can be distributed.

In accordance with an exemplary embodiment of the present disclosure, a first communication network section or Virtual Large Area Network (VLAN), including and/or interconnecting secondary equipment assigned to the first node or bus bar section, is delimited or defined within the SA communication system. The GOOSE and the SV network messages are then constrained to the VLAN, i.e. they are not distributed beyond a boundary of the VLAN. This ultimately reduces network traffic in the SA communication system. It is achieved, for instance, by means of switches in the SA communication network which are arranged at, and define, the boundaries of the VLAN, and which only selectively forward network messages originating from within the VLAN.

If all incoming voltage messages are based on the same sampling rate, then the first IED selects, based on some logical conditions, one of the incoming or received messages for output or distribution as a node voltage message, and simply replaces its source identification parameters. However, if different sampling rates exist, then due to the IEC 61850 standard rules the first IED needs to perform a re-sampling of the voltage indicated by the received SV message to the prescribed fixed sampling rate.

The first IED is either a dedicated process device physically placed in the vicinity of the assigned first node in the switchyard, or it is one physical part or a functionality of a central or station controller located in a central location. In the latter case, the requirements regarding electromagnetic shielding of the first IED are less stringent, due to the larger distance to the primary equipment and the shielding provided at the central location.

FIG. 1 depicts a single-line electrical power distribution diagram of a switchyard with a double bus bar topology according to an exemplary embodiment. The switchyard includes various primary devices, such as bus bars 1, circuit breakers 2, disconnectors 3, line infeed and outgoing conductors 4, nodes 5, and load or generators 6. The diagram further shows bays 7, which comprises the load or generators 6. Devices of the same kind are distinguished via a continued decimal digit, for example 5.1 and 5.2 denote two nodes. The icons representative of an open state of switches (circuit breakers 2 and disconnectors 3) are shown as outlined icons, and those of a closed state are shown as filled icons. For example, a closed/open disconnector 3 is depicted by a black/white rhombus. It is apparent that other topologies are conceivable, with or without any bypass buses, and the topologies may include other primary devices, such as power transformers, generators, earthing isolators and instrument transformers, for example, without limiting the applicability of the present disclosure.

In FIG. 1, the topology depicted includes two bus bars 1.1 and 1.2, which are separated by two circuit breakers 2.1 and 2.2. Each of the bus bars 1.1 and 1.2 is further separated into two bus bar sections by section circuit breakers 2.3 and 2.4. Further, three bays 7.1, 7.2 and 7.3 are depicted in the topology. The bays 7.1, 7.2 and 7.3 respectively include a bay circuit breaker 2.5, 2.6, 2.7 connected via conductors 4.1, 4.2, 4.3 to distant loads 6.1, 6.2 or generator 6.3. The bay circuit breakers 2.5, 2.6, 2.7 are each connected to the two bus bars 1.1 and 1.2 via two disconnectors 3.1, 3.2; 3.3, 3.4 and 3.5, 3.6, respectively. The disconnectors 3.1, 3.3 and 3.5 are connected to the bus bar 1.2 through nodes 5.1, 5.4 and 5.7, and to the bay circuit breakers 2.5, 2.6 and 2.7 through nodes 5.2, 5.5 and 5.8, respectively. Similarly, the disconnectors 3.2, 3.4 and 3.6 are connected to the bus bar 1.1 through nodes 5.3, 5.6 and 5.9, respectively. Further, the topology depicted in FIG. 1 shows the disconnectors 3.1, 3.3 and 3.6 in an open state and the disconnectors 3.2, 3.4 and 3.5 in a closed state. Hence, the bays 7.1, 7.2 and 7.3 are connected to the bus bar 1.1, 1.1 and 1.2, respectively.

Figure 2:
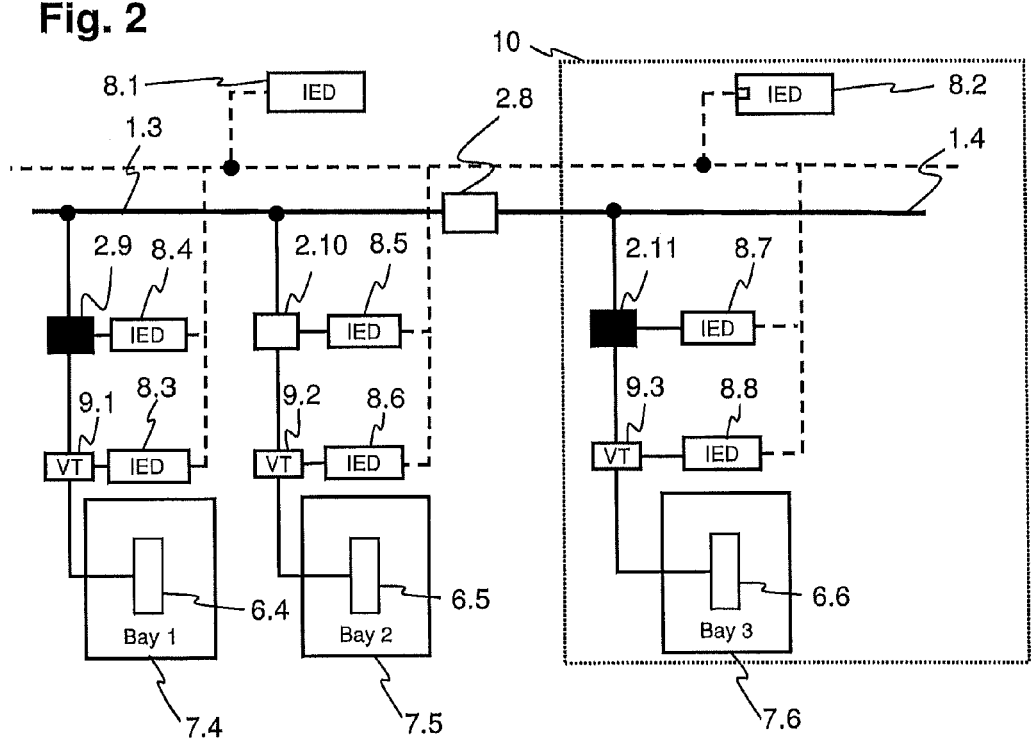
FIG. 2 shows a first node of a bus bar with a connected bay according to an exemplary embodiment of the present disclosure.

FIG. 2 shows a first node or bus bar segment 1.3 of a bus bar of a high or medium voltage substation controlled by a SA system, to which a first Intelligent Electronic Device (IED) 8.1 is assigned. A first bay 7.4 and a second bay 7.5 are connected to the first node 1.3. The bays 7.4 and 7.5 include loads 6.4 and 6.5, respectively. The bays 7.4 and 7.5 are connected to the first node 1.3 by switching devices 2.9 and 2.10, respectively. The switching devices 2.9 and 2.10 can be, for example, circuit breakers or connectors/disconnectors. A voltage transformer (VT) 9.1 is arranged between the first bay 7.4 and the switching device 2.9, and a second IED 8.3 is assigned to the VT 9.1. The switching device 2.9 is arranged between the first bay 7.4 and the first node 1.3, and is assigned a third IED 8.4. The black square icon in the switching device 2.9 shows that the switching device 2.9 is in the 'closed-switch' state, and the first bay 7.4 is connected to the first node 1.3. Similar to the first bay 7.4, the second bay 7.5 is connected to a VT 9.2, and an IED 8.6 is assigned to the VT 9.2. The switching device 2.10 is arranged between the second bay 7.5 and the first node 1.3, and is assigned an IED 8.5. The outlined square icon in the switching device 2.10 shows that the switching device 2.10 is in the 'open-switch' state, and the bay 7.5 is not connected to the first node 1.3.

Further, the first node 1.3 is separated from a neighboring bus bar section 10 by a circuit breaker 2.8. The neighboring bus bar section 10 includes the primary devices connected to the bus bar segment 1.4. Additionally, the neighboring bus bar section 10 includes an IED 8.2 assigned to a bay 7.6. Similar to the bays 7.4 and 7.5, the bay 7.6 also includes a load 6.6. A switching device 2.11 is arranged between the bay 7.6 and the node 1.4. Similar to the bays 7.4 and 7.5, the bay 7.6 includes a VT 9.3, and an IED 8.8 is assigned to the VT 9.3. Also, the switching device 2.11 is assigned an IED 8.7. The IEDs, 8.1 and 8.2, are part of the station level.

The topology depicted in FIG. 2 shows an example where the first IED 8.1 acts as a virtual VT for the first node 1.3, delivering the bus bar voltage as sample telegrams based on bay level process bus data instead of measurement with a 'real' VT. The first IED 8.1 selects the samples of one (e.g. the first detected) healthy and connected bay having voltage above zero, and communicates these voltage samples as bus bar voltage to the other bus bar segments, as this would have been done by an IED serving a 'real' VT. The basis for the voltage source selection logic at the first IED 8.1 is the state of the switches in the bays 7.4 and 7.5, as communicated in IEC 61850 systems via GOOSE messages for interlocking reasons, to avoid any additional communication load. To select a bay VT as a source for the bus bar segment, a series of switches of this bay to the virtual VT's bus bar segment must be in ON state, the samples must provide a non-zero voltage (if a non zero voltage is connected), and the sample quality must be good. If the first bay 7.4 is not connected to the first node 1.3, the first IED 8.1 is configured to determine the bus bar voltage at the first node 1.3 from the second bay 7.5, in case it is connected to the first node 1.3. Similarly, the first IED 8.1 continues to look for a 'healthy' bay connected to the first node 1.3 to determine the bus bar voltage at the first node 1.3. In case no bay is selected, the first IED 8.1 sends a preconfigured 'zero voltage' telegram.

The first IED 8.1 is provided with a standardized description of a substation topology, such as the configuration of the bays and the switching devices of a bus bar section, for example. Thereafter, the first IED 8.1 identifies whether the first bay 7.4 is connected to the first node 1.3, by using the switch status of the switching device 2.9 along with the standardized topology description. The first IED 8.1 receives, via a reception unit of the first IED 8.1, network messages from the third IED 8.4, indicating the switch status of the switching device 2.9. When the switching device 2.9 is in the closed state, the third IED 8.4 sends out a network message that the first bay 7.4 is connected to the first node 1.3. Further, the first IED 8.1 receives via its reception unit network messages from the second IED 8.3, indicating the bay voltage of the first bay 7.4. The second IED 8.3 receives the voltage values from the VT 9.1. When the first IED 8.1 receives the bay voltage of the first bay 7.4, the first IED 8.1 establishes the received bay voltage as the bus bar voltage at the first node 1.3, depending on the switch status. Once the first IED 8.1 establishes the bus bar voltage at the first node 1.3, the first IED 8.1 provides this voltage as samples on the bus bar, for example, according to IEC 61850-9-2 standards. According to an exemplary embodiment, the first IED 8.1 can include a control unit (e.g., a processor configured to execute computer-readable instructions recorded on a non-transitory computer-readable recording medium, such as a non-volatile memory) configured to establish the received bay voltage as the bus bar voltage at the first node 1.3, based on the switch status indicated in the messages received from the third IED 8.4.

When all bay level VTs provide the same sample rate, the first IED 8.1 routes the selected samples of the first bay connected to the first node 1.3, providing healthy data with its own identification back to the communication bus. When the bay VTs provide different sample rates, the first IED 8.1 interpolates the samples to its own preconfigured, fixed sample rate. Further, the first IED 8.1 can additionally provide a voltage RMS calculation, for example, as IEC 61850 DATA MMXN1.Volt, either with GOOSE or even with a MMS report.

Additionally, the logic to select a bay VT as a source for the bus bar voltage ensures that only one bus bar segment and its connection to other segments have to be considered for voltage selection, and not the connections within the other segments. This selection logic can be configured into the virtual VT, for example, the first IED 8.1, thus making it independent from changes in other parts of the switch yard, or could reside in some central controller, which communicates the selection result to the virtual VT, making the virtual VT simpler and allowing a 'one place change' on switch yard configuration changes. The selection logic further ensures that all healthy real VTs of the bays connected to the segment are used as voltage source. Also, the voltage selection logic at the bays involves the bays reading the samples provided by the virtual VT at the bus bar segment to which they want to connect. Switches in the SA communication network delimit a first communication network section interconnecting IEDs of the SA system that are assigned or related to the first bus bar node 1.3, constraining, for example, the network messages from the second and third IEDs 8.3 and 8.4, as well as from the IEDs 8.5, 8.6 of the second bay 7.5, to this communication network section, by forming a Virtual LAN (VLAN).

Figure 3:
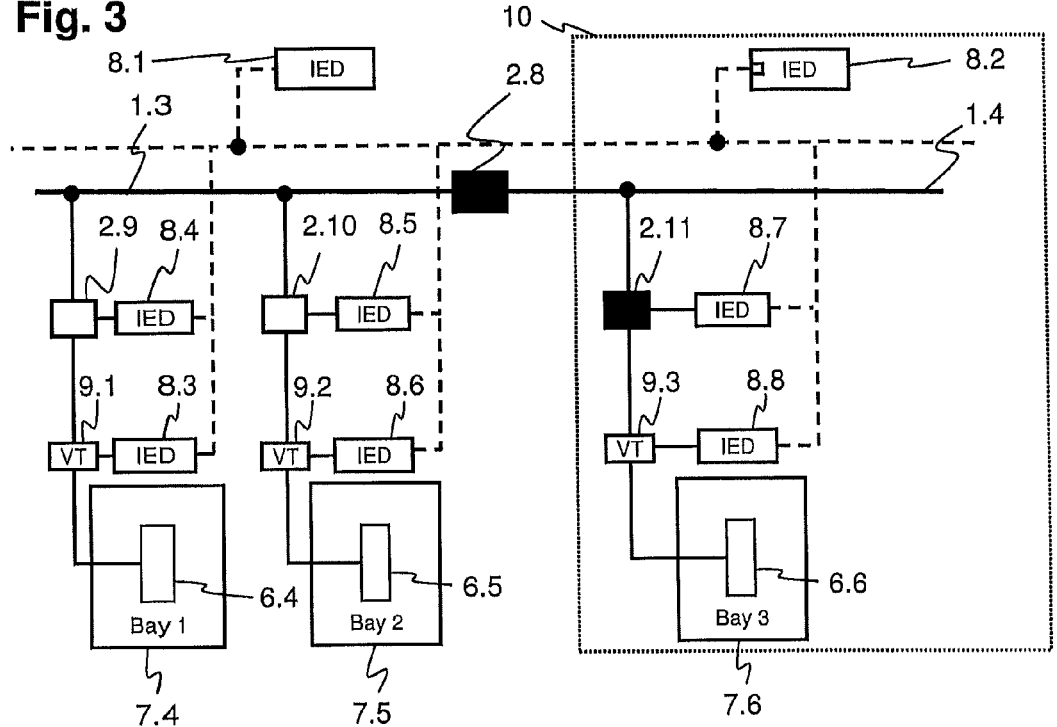
FIG. 3 shows a first node of a bus bar without any connected bay according to an exemplary embodiment of the present disclosure.

FIG. 3 depicts the IEDs 8.1, 8.2 connected to the two bus bar segments (nodes) 1.3 and 1.4, without any bay connected to the first node 1.3. The switching devices 2.9 and 2.10 are in an 'open switch' state (as shown by outlined icons), disconnecting the first bay 7.4 and the second bay 7.5 from the first node 1.3. Further, the circuit breaker 2.8 connecting the nodes 1.3 and 1.4, is in a 'closed switch' state. The first IED 8.1 can communicate with the devices of the bus bar section 1.4, for example, the IED 8.1 can communicate with the IED 8.2 of the bus bar segment 1.4. In this case, the first IED 8.1 can be configured to determine the bus bar voltage at the first node 1.3 from the neighboring bus bar section 10. The first IED 8.1 is configured with the switch positions to be closed in series to select the samples from a specific bay VT. Any neighboring bus bar segment (which might also contain a VVT) must get lower priority than 'real' bays in the selection process. Further, a central selection logic, based on the known switch yard topology and switch state, can determine the source VT(s) for each VVT, and configure it appropriately. This introduces a central point of failure needing some redundancy/backup, however it allows maintenance of the selection logic for complex switch yard configurations at one place. The VVT can further receive the selected state of circuit breakers together (in the same GOOSE message) with the switch states, and send its voltage samples only, if a CB is really selected.

For example, when the first IED 8.1 determines that none of the bays 7.4 and 7.5 is connected to the first node 1.3, it establishes the bus bar voltage of the first node 1.3 by using voltage samples from the neighboring bus bar section 10. Further, in the present configuration, the voltage value provided by the 'real' VT 9.3 to the IED 8.1 via the IED 8.8 is given preference over the voltage value that the IED 8.2 might provide to the IED 8.1. In case the first IED 8.1 is not able to establish the bus bar voltage at the first node 1.3 by either the bays connected to the first node 1.3 or the neighboring bus bar section 10, the first IED 8.1 sends a preconfigured 'zero voltage' network message to all the bus bar sections of the SA system.

Figure 4:
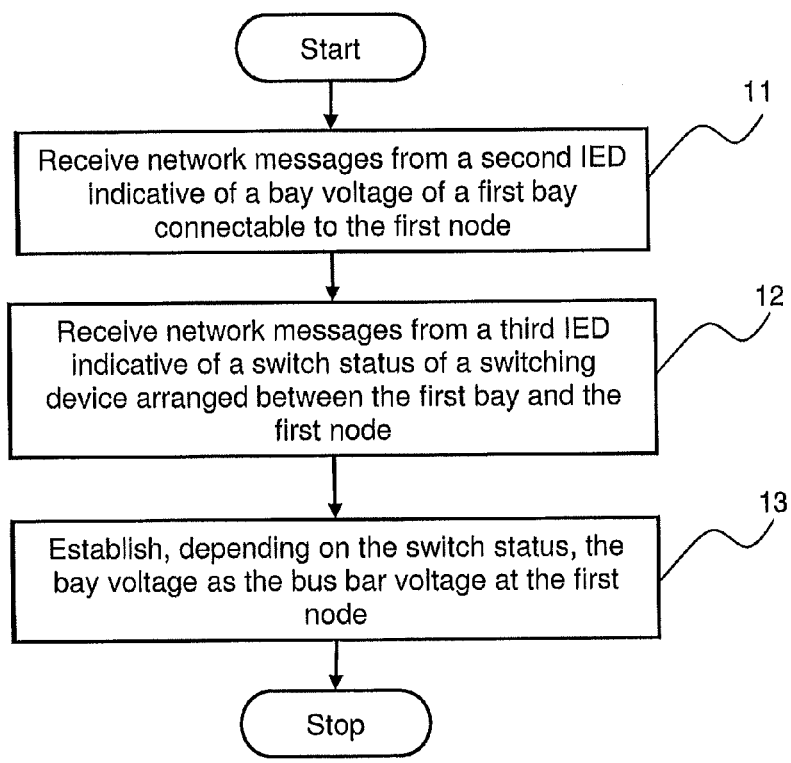
FIG. 4 is a flowchart illustrating an exemplary method for determining a bus bar voltage at a first node of a bus bar.

FIG. 4 is a flowchart illustrating an exemplary method for determining a bus bar voltage at the first node 1.3 of a bus bar of a high or medium voltage substation controlled by an SA system. At step 11, network messages are received by the first IED 8.1 from the second IED 8.3, indicating the bay voltage of the first bay 7.4, connectable to the first node 1.3. At step 12, network messages, indicating a switch status of the switching device 2.9, arranged between the first node 1.3 and the first bay 7.4, are received by the first IED 8.1, from the third IED 8.4. At step 13, the bay voltage of the first bay 7.4 is established as the bus bar voltage at the first node 1.3 by the first IED 8.1, depending on the switch status of the switching device 2.9. Thereafter, this voltage is made available to all the bays connected to the bus bar, and these bays can use the voltage to connect to the first node 1.3.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF DESIGNATIONS

1 bus bar segments
2 circuit breakers, switching devices
3 disconnectors
4 line infeed and outgoing conductors
5 nodes
6 load or generators
7 bays
8 IEDs
9 voltage transformer
10 bus bar section
11 first flowchart step
12 second flowchart step
13 third flowchart step

What is claimed is:
1. A method of determining a bus bar voltage at a first node of a bus bar of a substation controlled by a Substation Automation (SA) system, the method comprising:
receiving, by a first Intelligent Electronic Device (IED) of the SA system, network messages, from a second IED of the SA system, the messages comprising voltage samples of a bay voltage of a first bay connectable to the first node;

receiving, by the first IED of the SA system, network messages, from a third IED of the SA system, that are indicative of a switch status of a switching device arranged between the first bay and the first node; and identifying the first bay as being connected to the first node and establishing, by the first IED of the SA system, the bay voltage of the first bay as the bus bar voltage at the first node by comparing, by the first IED of the SA system, the switch status indicated in the network messages received from the third IED of the SA system with a standardized topology description of the substation.

2. The method according to claim 1, comprising:

providing the first IED with a static standardized description of a substation topology according to the substation communication standard IEC 61850; and sending, by the second IED and the third IED, Sampled Values (SV) comprising the bay voltage and Generic Object Oriented Substation Events (GOOSE) comprising the switch status, respectively.

3. The method according to claim 1, comprising:

establishing a voltage from a second bay connected to the first node or from a bus bar section neighboring the first node, as the bus bar voltage at the first node.

4. The method according to claim 1, comprising:

delimiting a first communication network section interconnecting IEDs of the SA system that are assigned to the first bus bar node; and constraining the network messages from the second and third IED to the delimited communication network section.

5. The method according to claim 1, comprising:

re-sampling, by the first IED, the bay voltage established as the bus bar voltage at the first node.

6. The method according to claim 1, wherein the substation is a high or medium voltage substation.

7. An Intelligent Electronic Device (IED) connectable to a Substation Automation (SA) communication network and assignable to a first node of a bus bar of a substation controlled by the SA system, the IED comprising:

a reception unit configured to receive network messages, from a second IED of the SA system, comprising voltage samples of a bay voltage of a first bay connectable to the first node, and to receive network messages, from a third IED of the SA system, that are indicative of a switch status of a switching device arranged between the first bay and the first node; and a control unit configured to identify the first bay as being connected to the first node and to establish, the bay voltage of the first bay as the bus bar voltage at the first node by comparing the switch status indicated in the messages received from the third IED with a standardized description of a static substation topology of the substation.

8. The IED according to claim 7, wherein the IED is part of a station level IED.

9. The IED according to claim 7, wherein the substation is a high or medium voltage substation.

10. A Substation Automation (SA) system comprising an IED configured to determine a bus bar voltage at a first node of a bus bar of a substation controlled by the SA system, wherein the IED comprises:

a reception unit configured to receive network messages, from a second IED of the SA system, comprising voltage samples of a bay voltage of a first bay connectable to the first node, and to receive network messages, from a third IED of the SA system, that are indicative of a switch status of a switching device arranged between the first bay and the first node; and a control unit configured to identify the first bay as being connected to the first node and to establish, the bay voltage of the first bay as the bus bar voltage at the first node by comparing the switch status indicated in the messages received from the third IED with a standardized description of a static substation topology of the substation.

11. The SA system according to claim 10, wherein the substation is a high or medium voltage substation.

* * * * *